Nov. 9, 1954         W. A. GEPPELT         2,694,164
                      MAGNETIC WHEEL
                    Filed Feb. 7, 1952
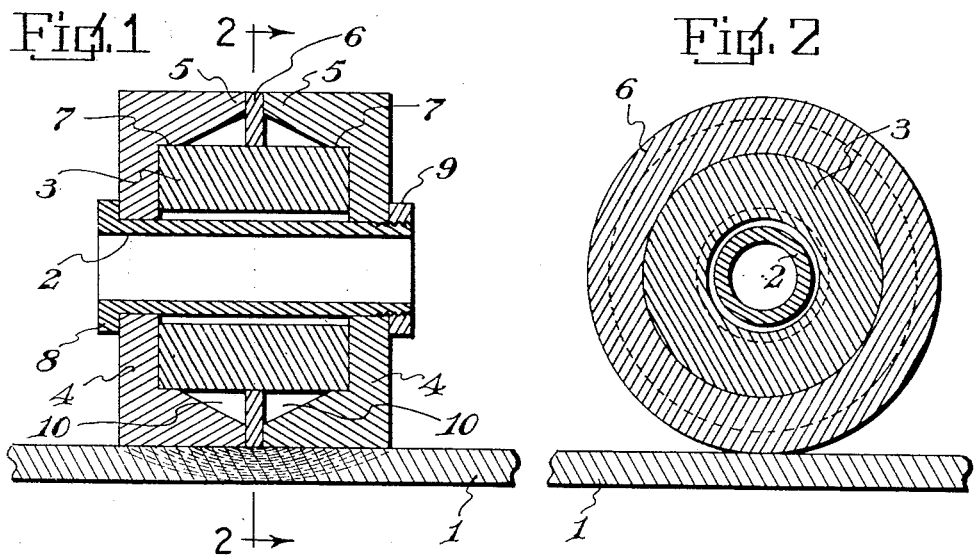
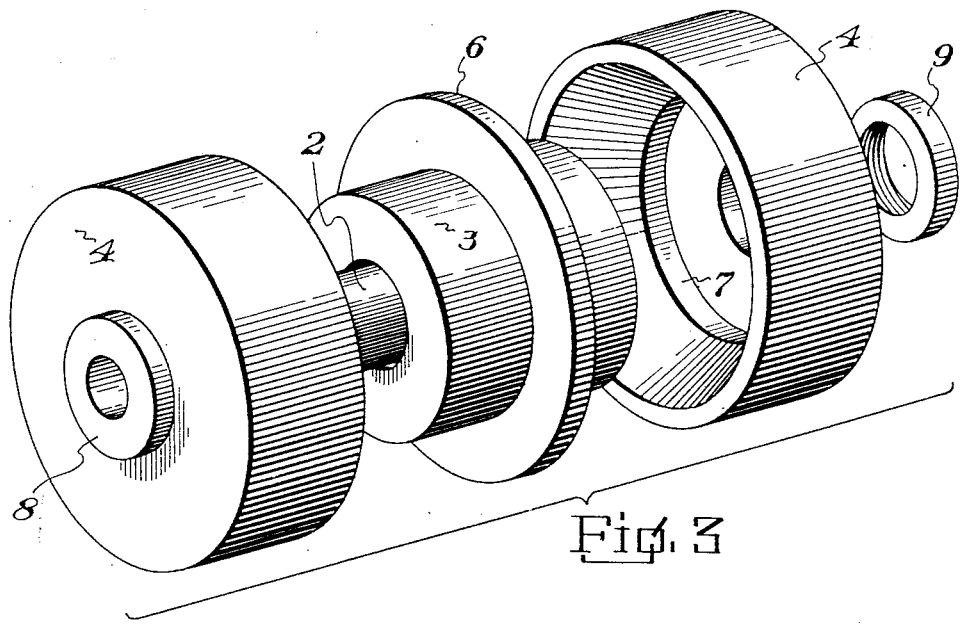
Walter A. Geppelt
INVENTOR
ATTORNEY

United States Patent Office 2,694,164
Patented Nov. 9, 1954

2,694,164

MAGNETIC WHEEL

Walter A. Geppelt, Tulsa, Okla.

Application February 7, 1952, Serial No. 270,423

2 Claims. (Cl. 317—159)

The invention relates to magnetic wheels of the type used in connection with welding and cutting torch carriages which are self-propelled over a metallic surface, usually supported on four magnetic supporting wheels, and has for its object to provide a magnetic wheel of maximum attractive characteristic to positively hold the carriage to traverse a predetermined course.

A further object is to provide a magnetic wheel comprising a cylindrically shaped magnet having a chamber therethrough, and through which chamber a non-magnetic sleeve passes and reversably positioned soft steel cups, clamped to the ends of the magnet, and having their annular flanges in engagement with a non-magnetic spacer disc extending around the magnet. Also to bevel the inner sides of the flanges of the soft steel cups whereby there will be a reduced and gradually reduced thickness of the cup flanges as they approach the spacer disc, to give the greatest flux in the thick portions of the cups adjacent the end of the magnet, and increase the holding power of the wheel on the work.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a vertical longitudinal sectional view through the magnetic wheel, showing the same supported on the work.

Figure 2 is a vertical transverse sectional view through the wheel and work taken on line 2—2 of Figure 1.

Figure 3 is a collective detail perspective view showing the parts in position to be assembled.

The magnetic wheel is of the type generally used in connection with traversing welding and cutting torch machines which are magnetically held to the work.

Referring to the drawing, the numeral 1 designates the work over which the wheel rolls after the machine, supported by the wheel, starts a traversing operation over the work. The magnetic wheel comprises a central sleeve 2 of non-magnetic material, and surrounding said sleeve, preferably in spaced relation thereto, is the magnet 3. Disposed on the ends of the sleeve 2 are reversally positioned cup shaped members 4 formed of soft steel. The cup shaped members 4 have their flanges 5 extending towards each other and into clamped close engagement with opposite sides of the non-magnetic spacer disc 6. Spacer disc also surrounds the magnet 3 intermediate its ends.

The ends of the magnet 3 are disposed in chambers 7 in the inner faces of the cups 4 and snugly held in said chambers. One end of the non-magnet sleeve 2 is provided with an annular flange 8 engaging the outer face of one of the cups 4, and the other end of said sleeve is provided with a non-magnetic nut 9 threaded on the sleeve 2, and by means of which nut the entire assembly can be drawn together into close engaging contact. It will be noted that the annular flanges 5 of the soft steel cups 4 are bevelled on their inner sides so there is a gradual decrease in radial thickness to a point where the narrow edges of the cups engage the non-magnetic spacer disc 6. By this particular construction annular chambers 10 are formed around the magnet, said chambers being substantially triangular in cross section. Applicant is of the opinion he gets the maximum efficiency by the shape of the flanges 5, as the main portion of the flux flow is at the ends of the magnet, and the flux flow graduates down to where the narrow edges of the cups contact the non-magnetic spacer disc. It will be noted that the thicker portion of the flanges and cups is disposed where the flux flow is greatest, hence the wheel is attracted to the work with greater force along spaced lines as the wheel moves over the work.

Heretofore, magnetic wheels have been used where the flanges 5 are of uniform thickness. In an actual test with the same magnet in such a wheel, and in applicant's wheel, it was found that the old wheel had a holding ability of thirty pounds, however the same magnet placed in applicant's structure and cups had a holding ability of one hundred and fifteen pounds. Measurements made of both wheels show that the magnet portions of Alnico V were of equal volume.

From the above it will be seen that a magnetic wheel is provided which has the maximum attractive force, and one applicant believes the additional attractive force is obtained by the flange shape, and possibly the shape of the chambers 10.

The invention having been set forth what is claimed as new and useful is:

1. A magnetic wheel adapted to be magnetically held to work as it rotates and traverses the work, said wheel comprising two cylindrical magnetic members disposed in spaced apart, confronting relation, annular flanges carried by the outer peripheries of said cylindrical magnetic members and extending inwardly relative to each other and having free edges spaced slightly apart, the inner sides of the flanges being beveled so that the flanges continuously increase in radial thickness substantially to the cylindrical magnetic members, an annular permanent magnet magnetized in its axial direction axially disposed between the cylindrical magnetic members and having its ends engaging the cylindrical magnetic members, a non-magnetic spacer disc surrounding the annular magnet and having its outer edge portion interposed between the free edges of the flanges and a non-magnetic sleeve bolt extending through the cylindrical magnetic members and axially through the annular magnet for clamping the free edges of the flanges against the disc and the cylindrical magnetic members against the ends of the annular magnet.

2. A magnetic wheel as claimed in claim 1, wherein the inner sides of the cylindrical magnetic members are formed with annular shoulders defining annular chambers which receive the ends of the annular magnet.

References Cited in the file of this patent

UNITED STATES PATENTS

| Number | Name | Date |
|---|---|---|
| 1,659,848 | Wilson | Feb. 21, 1928 |